United States Patent Office
3,616,677
Patented Nov. 2, 1971

3,616,677
ELECTRICAL RESISTANCE BRIDGE WITH A HEAT SENSITIVE RESISTOR FOR THE MEASUREMENT OF THE THERMAL DISPERSION WITHIN THE AMBIENCE OF THE RESISTOR
Mogens Oppegaard, Torshov, Norway, assignor to Asbjorn Oppegaard, Lillestrom, Norway
Filed Aug. 28, 1969, Ser. No. 853,664
Claims priority, application Norway, Aug. 28, 1968, 3,345/68
Int. Cl. G01n 27/18; G01r 27/00
U.S. Cl. 73—27
1 Claim

ABSTRACT OF THE DISCLOSURE

An electric resistance bridge circuit, including a main bridge and an auxiliary bridge, the main bridge including a temperature sensitive reference resistor adapted to be influenced by its ambience in a normal or reference state, a temperature sensitive sensing resistor adapted to be influenced by its ambience in a state differing from said normal or reference state, and a bridge resistor in series with said sensing resistor. The reference resistor is arranged in one arm of said main bridge, and the sensing and the bridge resistors are arranged in another arm of said main bridge, an amplifier is included, the input of which is connected to the output of the main bridge, a recording instrument is connected to receive as its input signal a signal derived from the output of the amplifier, the output of the amplifier being connected to diagonally opposite points of said auxiliary bridge, the auxiliary bridge having one of its arms formed by said sensing resistor and another of its arms formed by the bridge resistor, one of the diagonally opposite points being the point of junction between the sensing resistor and the bridge resistor, whereby any imbalance signal in the main bridge is amplified by the amplifier and the resulting output signal current therefrom is divided into a compensating current through said sensing resistor, and a current through said bridge resistor, thus keeping the total voltage across the series connection of the sensing resistor and the bridge resistor as well as the current through the reference resistor substantially constant.

---

Electrical bridge circuits are used in many physical-chemical devices. Different ways of connection have been used, and they often bear the name of the inventor, e.g. Wheatstone, Hooke, Kelvin etc.

By applying a voltage the temperature of a resistor in a bridge circuit may be raised above the ambient temperature, and using the thermal dispersion capacity, it is possible to determine in ambience the temperature, pressure, rate of flow, thermal conductivity, constitution etc. Imbalance in a bridge circuit may be used as a measurement signal and it is also known that compensatory currents from servo-mechansims and amplifiers have been used. Therefore, resistance materials with a high negative or positive temperature resistance coefficient are employed in such a resistor or resistors.

The advantages of the present invention are most easily seen by comparison with the usual types of circuit. For comparison purposes a gas-chromatograph detector is used as a typical example of analysis apparatus.

Figure 1:
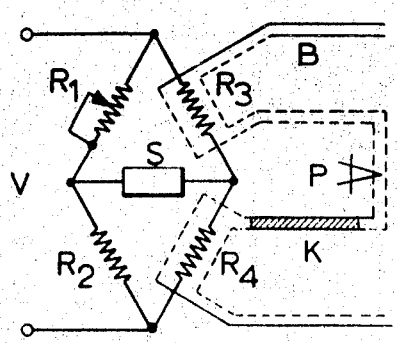

FIG. 1 shows an example of a prior art bridge in such an apparatus. In the figure the drawing of the gas lines is simplified to the minimum required to provide an illustration as to how the bridge works. Carrier gas enters at B and serves as a conveyor of, and also for comparison of, the gas to be analysed. As a carrier gas we may assume the use of, for example helium. Helium flows round reference-resistor $R_3$, continues through tube K, flows round sensitivity-resistor $R_4$ and then passes out. The usual international terms for reference and sensitivity resistors are respectively, Ref and Sens. The ohm resistance of Sens is very sensitive to temperature and a platinum wire is used, having a positive temperature coefficient. Theoretically, Ref could be set up outside the gas flow as a constant resistance. However, by building it into the gas flow one compensates to some extent for interference such as noise from undesirable variations in the rate of flow of the gas. Accordingly, Ref and Sens are therefore assumed to be identical. Current consumption of instrument S is ignored.

Figure 2:
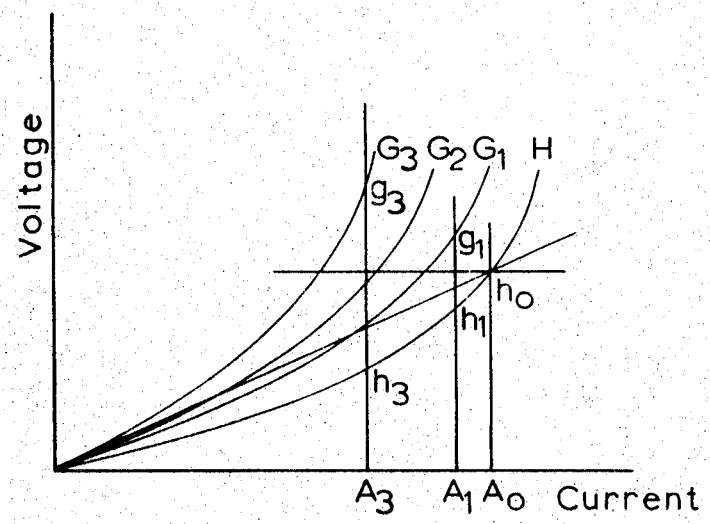

Curve H in FIG. 2 shows the voltage of wire as a function of the current when the wire is surrounded by helium. When the wire is surrounded by gases of a lower thermal dispersion capacity than helium, the wire increases in temperature and resistance. In this case the volt/ampere function is represented by curve $G_1$. Other gases are represented by curves such as $G_2$, $G_3$, etc.

With both Ref and Sens in a helium gas medium the voltage V (FIG. 1) is set so that the common current through the wires is $A_0$. The setting for both wires corresponds to point $h_0$. The bridge of FIG. 1 is compensated for by making the resistance ratio $R_1/R_2$ equal to ratio $R_3/R_4$. There is no voltage generated over the diagonal at S and the chromatograph is now ready for use.

The amount of gas to be analysed, e.g. 0.1 ml. is admitted via sample-injector P, and the sample is driven by the helium flow into the column K. This column contains a chemical preparation suited to the nature of the gases so that each gas is retained to a varying degree. The components follow each other, at intervals from the column together with helium and then flow about Sens. When Sens is surrounded by a gas with a thermal dispersion capacity corresponding to e.g. curve $G_1$ the wire will acquire a voltage corresponding to $g_1$ and the Ref-wire a voltage equal to $h_1$. The common current is $A_1$. The vertical distances $g_1-h_0$ and $h_0-h_1$, are equal and the sum of the Ref and Sens voltages is as before $2h_0=V$. If Sens is surrounded by a gas corresponding to curve $G_3$, the respective voltages will be $g_3$ and $h_3$, and the current $A_3$. Half the differential voltage is registered at S and serves as a unit measure for the analysis.

Each point on the straight line through origin and $h_0$ gives the same wire temperature as in helium since the resistances of the wires are then constant and the volt/ampere ratio the same for each point. Point $g_3$ corresponds to a higher temperature than $h_0$.

In the following description some of the drawbacks of the prior art circuits are pointed out. In general it is known that an analysis system should give the true condition of the sensor's ambience. In order to do this the sensor must enter into equilibrium with its ambience, this, however, is a slow process, with the rate of adjustment dependent on, inter alia, the possibility of thermic energy transfer and the thermic mass of the sensor. A sensor will always have a certain mass and thererfore a certain thermic inertia. Its temperature and, thereby its resistance cannot therefore vary in strict accordance with corresponding variations in ambience. This is particularly noticeable with more rapid variations in ambience, and obtaining the desired measurements may be prevented by sensors not having a sufficiently low time constant. The time constant is usually defined as the time a sensor needs to indicate 63.2% of a step change in ambient properties. In an effort to obtain sensors with low time constants, efforts are now being made to design these with a large surface-area and small mass. Platinum films of thicknesses of the order of micrometres and wires with diameters down to e.g. 3 micrometres have been tried. Thermistors are often manufactured in the form of small spherules. A clear disadvantage of such designs is that sensors are weakened under the influences of mechanical stress, wear, vibration, corrosion etc. Sometimes the nature of the ambience is such that sensors have to be protected by a covering sleeve, or some similar arrangement. All forms of protection of this nature will form part of the thermic mass of the sensor and will correspondingly increase the thermic inertia of the system.

The above applies in general, but for gas chromatographs in particular, however, rapid variations in the ambience of the sensor may occur. If the time constant of the detector is high, the composition of the gas cannot be correctly determined as it passes through the detector. Undesirable phenomena may occur, such as widening of peaks and asymmetrical effects, and these may lead to an overlapping of peaks which had been previously correctly separated in the column. As will be seen from FIG. 2 the lag and thermic inertia in the usual type of circuit come not only from Sens, but also from Ref, since both acquire varying temperatures.

It has been found that for a hot wire detector the sensitivity of the apparatus, or rather the voltage across instrument S, is more or less proporional to the heating current raised to the third power. In order to register small concentrations in gas mixtures to a satisfactory accuracy, it is necessary to apply a high heating current $A_0$. Undesirable effects will arise if air, oxygen or other gases enter which may attack the wire. This aggressive effect will increase with a higher wire temperature and may result in the cross-section of the Sens-wire being reduced, in view of which the resistance will be increased and this in turn will lead to the wire being supplied with a still higher voltage from the bridge. Up to now, at best, this has meant a resultant change in the wire involving the necessity of re-calibrating the whole of the apparatus, and, at worst, the causes and effects mentioned are compounded so that the wire is totally destroyed. In practice, any such attack on the wire is indicated by the recording instrument S failing to return to its original zero position when Sens is again surrounded by a pure carrier gas after the test gases have passed through. If during and after registering it is not possible to refer to a fixed zero line, the measured result becomes unreliable and sometimes so erratic as to be worthless.

Figure 3:
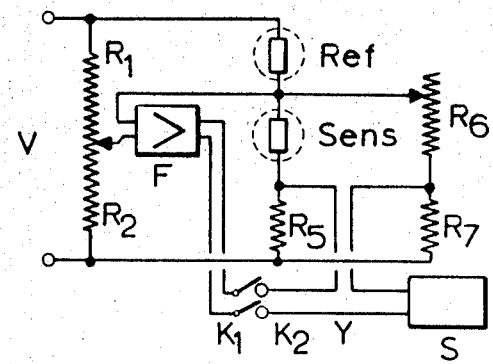

Variations in the design of bridge circuits are known where a compensatory current is applied to Sens with the help of servo-mechanisms, amplifiers and counter-circuits. This invention is adapted to produce a measuring bridge in which the disadvantages of previous designs are avoided. This is achieved by the method described hereinbelow in greater detail. FIG. 3 shows an exemplary embodiment of the bridge circuit of the invention. Here, too, to facilitate the function special reference is made to gas chromatography, however, it is obvious that the use of the circuit is in no way limited thereto.

F is an amplifier incorporating isolation between the input and output terminals. For simplicity it is assumed that there is a very slight energy consumption on input, and sufficient energy output from the amplifier.

$R_1$, $R_2$, $R_6$, $R_7$ and especially $R_5$ should be temperature insensitive. S is again the recording instrument, but with the addition of a shunt, the current is designated Y.

V is set first so that Sens acquires a compatible temperature with the test gas. At this setting Sens and Ref are surrounded by the carrier gas, which is helium. The ohm resistance of Sens is dependent on the temperature, and at the acquired temperature of Sens, $R_6$ is set so that the resistance ratio $R_6/R_7$ is equal to $R_{Sens}/R_5$. The citerion is that no voltage is generated at the terminals $K_2$. $R_7$, for example, may be more or less the same as $R_{Sens}$ in hot condition. $R_5$ may be some percent or some thousandths of this value. The values should be adapted to the range of the amplifier and measuring instrument S. Then the ratio $R_1/R_2$ is adjusted until the amplifier provides no imbalance at $K_1$. Terminals $K_1$ are now attached at their correct polarities to terminals $K_2$ and the apparatus is now ready for use.

If the Sens wire is now surrounded by a gas corresponding to curve $G_3$ in FIG. 2, the bridge is not unbalanced in the same way. When $R_6/R_7=R_{Sens}/R_5$, and Sens are kept constant by some means, it will be evident that any current Y introduced at $K_2$ does not affect the total voltage across Sens and $R_5$. If, in addition, a heating current is passed through Ref, it is noted by superposition that current Y causes an increase in voltage through $R_5$ equal to the decrease in voltage through Sens, so that Y even at that point retains the same total voltage. Y, therefore, does not cause any imbalance and the amplifier receives no signal.

If, on the other hand, the resistance in Sens fails to remain constant, but has a tendency to rise on the basis of a temperature increase in a gas other than helium, the bridge is then no longer in equilibrium at the set ratio of $R_1/R_2$. The amplifier receives a signal and emits current Y. The current is received at $K_2$, passes through the recording instrument S, which has a shunt, divides through $R_6$ and $R_7$, passes through $R_5$ in the same direction as the heating current, but through Sens in a direction opposite to that of the heating current, and out through $K_2$.

When the amplification, as assumed, is sufficiently large, the amplifier generates a current so that the signal is nullified.

In this manner, Sens receives a lower total current so that the temperature, and thereby the resistance, is maintained at its original value. Since $R_5$ is constant, Y does not influence the total voltage. Voltage and current through Ref are therefore kept constant.

By reason of the prior setting Ref and Sens in this bridge have different heating currents, with the resistance ratio suggested the current through Sens will be, for example, some thousandths less than through Ref. This can be compensated for and entails no real disadvantages, and moreover, may be of practical values, since it is very difficult to make two heating wires having a difference in characteristics of less than one thousandth. To ensure as little interference as possible from variations in the carrier gas, it is now possible to change over the sensors, for instance thermistors or resistors, from Ref to Sens and vice versa to obtain the optimum of compensation.

Due to the prior set resistance ratio Y is proportional to its component through Sens. Y therefore provides an indirect measure of the thermal dispersion capacity in the gas which now surrounds the Sens wire, when using helium as a comparison gas.

The amplifier returns toward a zero position and should, in effect, react to small signals. The output current is by no means bound to increase in proportion with the intensity of the signal, and, consequently, the amplifier presents no problem. Simple experimental arrangements with only two pairs of transistors provided current and voltage paths very close to the conditions described above. Phenomena such as overshoot and oscillation did not occur.

When amplification is of a lower magnitude, current Y still continues to provide a correct reading of static thermal dispersion, but Ref, and especially Sens no longer hold so close to an even temperature.

Figure 4:
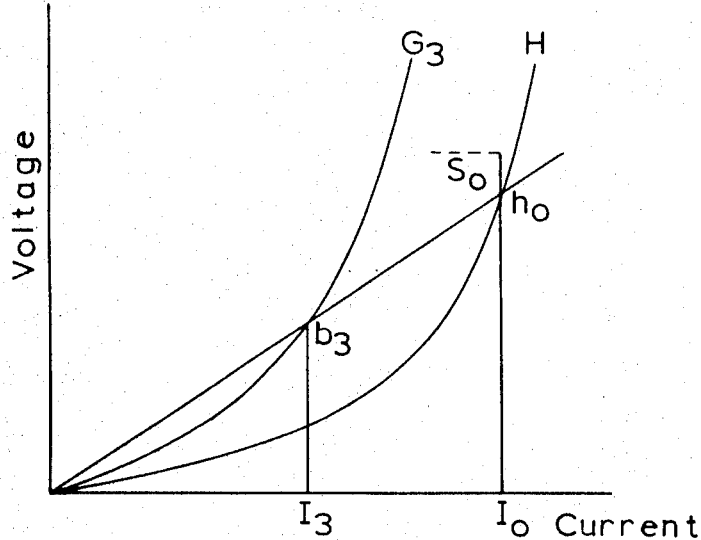

FIG. 4 shows current and voltage conditions in this bridge, utilizing an ideal amplifier. Curve H shows the Sens wire's voltage as a function of the current when the wire is surrounded by helium it being essentially the same curve as shown at FIG. 2. Curve $G_3$ is also the same, whereas curves $G_1$, $G_2$ etc. are omitted to simplify the figure.

Point $h_0$ in FIG. 4 represents the current and voltage in the Sens wire when the heating current $I_0$ is previously set in helium gas. Vertical Height $s_0$–$h_0$ equals the voltage over $R_5$. The straight line through the origin and $h_0$ represents a constant resistance and a corresponding constant wire temperature.

Since the Sens wire, which is now surrounded by a gas corresponding to curve $G_3$, $b_3$, must lie on this curve, the bridge ensures that concurrently $b_3$ lies on the line for a constant temperature. The difference $I_0-I_3$ is the counter-current in the wire. The current in $R_5$ provides a voltage increase equal to the vertical distance $h_0-b_3$. The voltage through Ref equals $V-s_0$ and is constant. Similarly, the current remains constant.

The amplifier current Y is recorded, and since Y an account of the resistance ratio given, is independent of the difference $I_0-I_3$, the recording affords an indirect measurement of the thermal dispersion capacity of gas $G_3$, using helium as a standard.

As a result of this arrangement the Sens wire is maintained at a constant temperature. This also applies to the Ref wire and therefore this circuit, in contrast to the prior art type of circuit, excludes all possibility of thermal inertia. This provides the possibility of obtaining a correct response to rapid changes in the ambience of the sensor.

Another advantage derived with the present invention is the improved range in choice of a heating current. As previously mentioned, the sensitivity of a bridge is more or less proportional to the heating current to the third power, and small amounts of gas in a test-sample require a high heating current to be recorded to a satisfactory degree of accuracy. This creates the risk of the Sens wire being attacked, cause the cross section of the wire to be reduced, and effecting structural changes whereby its resistance is altered where the heating current $A_0$ is set at a high value. Against this background condition, the circuit of this invention affords the following advantages:

Assuming for the Sens wire the same maximum temperature allowed for usual circuits, $I_0$ can be set at a higher prior value than $A_0$ (FIG. 2 resp. 4). The ratio between the sensitivities in the bridges will be approximately $(I_0/A_0)^3$. This increase in sensitivity is a very useful characteristic in many analyses.

Another advantageous consequence of the constant-temperature principle is that any attack on the Sens wire, e.g. through corrosion, leads a reduced current to the bridge (as in FIG. 4) feeding the wire, and in this manner the danger of more extensive damage to or destruction of the wire is greatly reduced.

If the test-sample contains a gas with a greater thermic dispersion capacity than the carrier gas, the signal will be negative when compared with the heretofore described examples. In such cases it is possible to use an amplifier which will provide current flow in the opposite direction. Another possibility is that the amplifier provides a standing current only as long as pure gas is passing through, and whereby this current may be increased or decreased.

The bridge in FIG. 3 may also be operated by an alternating current, of an intensity of e.g. 325 Hz.

What is claimed is:

1. An electric resistance bridge circuit, comprising a main bridge and an auxiliary bridge, said main bridge including a temperature sensitive reference resistor adapted to be influenced by its ambience in a normal or reference state, a temperature sensitive sensing resistor adapted to be influenced by its ambience in a state differing from said normal or reference state, and a bridge resistor in series with said sensing resistor, said reference resistor being arranged in one arm of said main bridge and said sensing and said bridge resistors being arranged in another arm of said main bridge, an amplifier the input of which is connected to the output of said main bridge, a recording instrument connected to receive as its input signal a signal derived from the output of said amplifier, the output of said amplifier being connected to diagonally opposite points of said auxiliary bridge, said auxiliary bridge having one of its arms formed by said sensing resistor and another of its arms formed by said bridge resistor, one of said diagonally opposite points being the point of junction between said sensing resistor and said bridge resistor, whereby any imbalance signal in said main bridge is amplified by said amplifier and the resulting output signal current therefrom is divided into a compensating current through said sensing resistor, and a current through said bridge resistor, thereby maintaining the total voltage across the series connection of said sensing resistor and said bridge resistor, and the current through said reference resistor substantially constant.

References Cited

UNITED STATES PATENTS

| 2,719,263 | 9/1955  | Flowers    | 324—62  |
| 2,759,354 | 8/1956  | Cherry     | 73—27   |
| 2,879,142 | 3/1959  | Jones      | 23—255  |
| 2,997,652 | 8/1961  | Engen      | 324—106 |
| 3,048,778 | 8/1962  | Rumpel     | 324—95  |
| 3,480,397 | 11/1969 | Baumgartel | 23—232  |

RICHARD C. QUEISSER, Primary Examiner

C. E. SNEE, III, Assistant Examiner

U.S. Cl. X.R.

323—75; 324—95; 23—255 E